May 21, 1935.   H. F. PARKER   2,001,939

BRAKE

Filed May 17, 1930

INVENTOR.
HUMPHREY F. PARKER
BY M. W. McConkey
ATTORNEY

Patented May 21, 1935

2,001,939

UNITED STATES PATENT OFFICE 2,001,939

BRAKE

Humphrey F. Parker, South Bend, Ind., assignor to Bendix Brake Company, South Bend, Ind., a corporation of Illinois Application May 17, 1930, Serial No. 453,390

9 Claims. (Cl. 188—78)

This invention relates to brakes and more particularly to internal expanding brakes.

An object of the invention is to provide a simple and inexpensive operating member for the friction elements of a brake.

Another object of the invention is to provide an operating member for the friction elements of a brake in which equal action between the friction elements is attained.

A further object of the invention is to provide a member for actuating the friction elements of a brake wherein the applied forces may be materially increased or multiplied.

Yet a further object of the invention is to provide a member for actuating the friction elements of a brake with a balanced action between the friction elements.

Still a further object of the invention is to provide an operating member for the friction elements of a brake supported on the separable ends of the friction elements, so that contact or engagement with the operating member is maintained at all times regardless of the position thereof.

An important feature of the invention is a floating operating member for actuating the friction elements of a brake supported on the separable ends of the friction elements.

Figure 1:
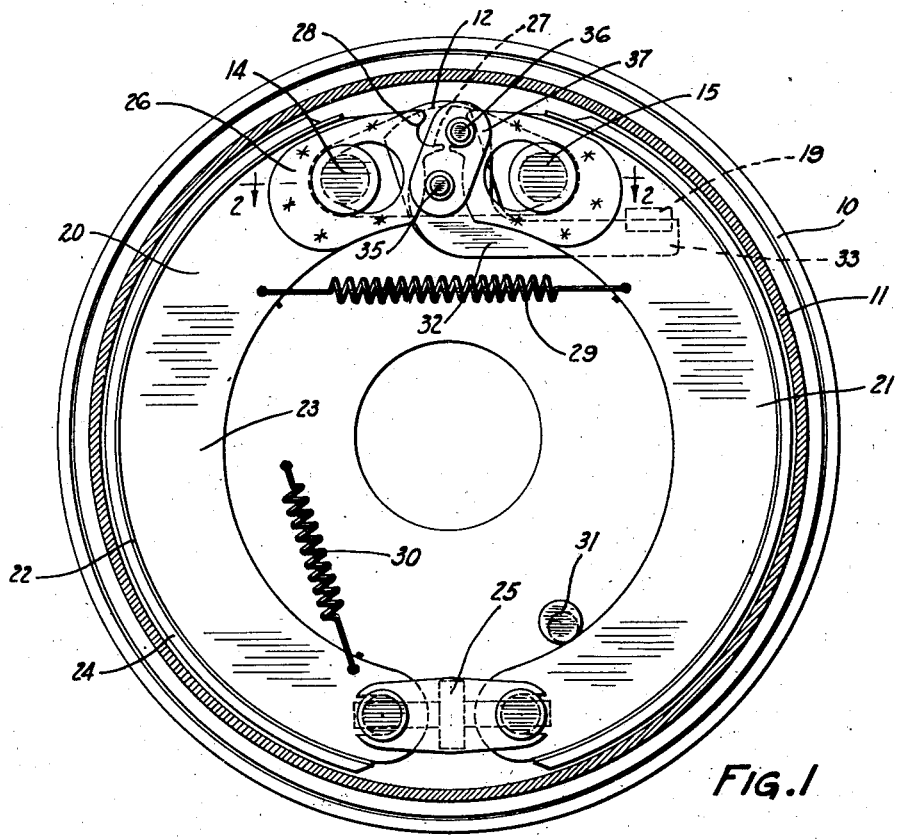
Figure 2:
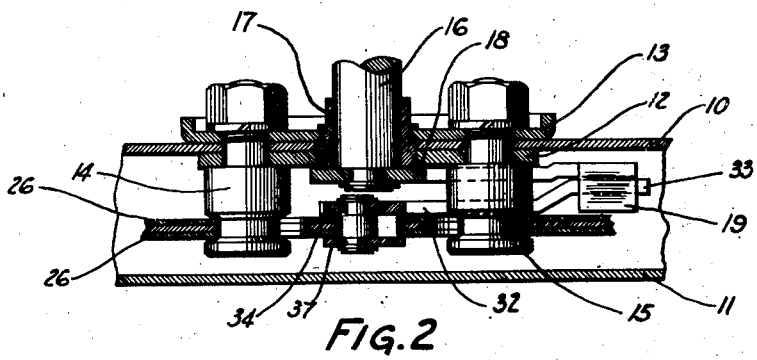

Other objects and structural details of the invention will be apparent from the subjoined description in connection with the accompanying drawing, in which:

Figure 1 is a vertical sectional view just back of the disk portion of the brake drum illustrating the friction members in elevation; and Figure 2 is a sectional view substantially on line 2—2, Figure 1.

Referring to the drawing for more specific details of the invention, 10 represents a fixed support such as a backing plate having associated therewith a rotatable drum 11 which may be secured to a wheel, not shown.

The backing plate 10 is provided with reinforcing plates 12 and 13 suitably secured in position by anchors 14 and 15 and positioned between the anchors 14 and 15 is an operating shaft 16. As shown, the operating shaft is positioned for rotation in a suitable bearing 17 mounted in registering apertures in the backing plate 10 and reinforcing plates 12 and 13. The operating shaft has secured thereto a crank 18, the free end of which is provided with a lateral projection 19, the object of which will hereinafter appear.

Positioned for movement on the anchors 14 and 15 are friction elements 20 and 21. As shown, the friction elements are conventional. Each comprises a rim 22 supported by a suitable web 23 and the rim has a suitable lining 24 secured thereto adaptable for co-operation with the radius of the drum.

The articulated ends of the shoes are connected by an adjusting member 25 and the separable ends which are supported on the anchors 14 and 15 are equipped with reinforcing plates 26. These plates are arranged on the respective sides of the web and the plates and webs are provided with lugs or projections 27 and notches 28, the object of which will hereinafter appear.

As shown, the friction members 20 and 21 are connected by a coil spring 29 and the member 20 is connected by a coil spring 30 to the backing plate. These springs serve to return the friction elements to the off position when the brakes are released and to retain the friction elements against the anchors and an adjustable stop 31 positioned on the backing plate.

A floating operating member 32 is supported between the separable ends of the friction elements. This member comprises an arm 33 adaptable for engagement with the lateral projection 19 on the crank arm secured to the operating shaft 16. The arm 33 has a lateral projection 34 in which studs 35 and 36 are positioned. These studs support a plate 37 in spaced relation to the lateral projection 34.

As shown, the lateral projection 34 and the plate 37 engage the reinforcing plates on the respective sides of the friction elements to provide suitable guides for the operating member. The studs 35 and 36 are adaptable for engagement with the respective ends of the friction element. The stud 36 is seated in the notch 28 and is engaged by the lug or projection 27 which normally suspends the operating member in proper relation to the friction elements. These studs are preferably provided with thrust rollers which materially improve the structure, since they provide for a smooth operation in actuating the friction elements for engagement with the drum.

The operating member is the salient feature of this invention. It provides an exceptionally simple and efficient means for actuating the friction elements comprising a single floating lever supported solely on the movable or separable ends of the friction elements and embodies means for multiplying the leverage to increase the applied forces in the actuation of the friction elements.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A brake comprising a fixed support, a plurality of friction elements positioned for movement on the support, an operating shaft positioned for rotation on the support, an operating member extending substantially at right angles to a radius of the brake passing through the operating shaft and supported on the separable ends of the friction members and means floatingly connecting the operating member with the operating shaft lying between the support and operating member.

2. A brake comprising a friction element having separable ends provided with notches and cam surfaces and an operating lever having thrust members engaging one notch and one cam surface.

3. A brake comprising a friction element having separable ends provided with oppositely disposed notches and cam surfaces, an operating lever and thrust members on the operating lever engaging the notches and cam surfaces.

4. A brake comprising a friction element having separable ends each provided with a notch, in oppositely disposed relation, an operating lever having a pair of thrust members one of which is retained in the notches and the other of which engages the shoe ends adjacent the notches.

5. A brake comprising a friction element having separable ends each provided with an oppositely arranged notch, lugs on the separable ends adjacent the notches, an operating member having a pair of thrust members one of which is confined between the notches by the lugs and the other of which engages the shoe ends adjacent the notches.

6. A brake comprising a drum, floating friction means having separable ends, an operating means for spreading the adjacent ends of said friction means free to float therewith, anchor means for the ends of said friction means, and a second lever extending substantially at right angles to a radius of the brake passing between the adjacent ends pivoted adjacent said ends and anchor and adapted to disconnectedly turn in the same direction and drive said operating means substantially free from the effect of floating thereof.

7. A brake comprising a backing plate, a floating friction shoe, a floating actuating lever, a pivoted lever extending substantially at right angles to a radius of the brake passing through the pivot, one of said levers being substantially between the other and the backing plate, and a lug on one of said levers slidably engaging the other.

8. A brake comprising a backing plate, a floating friction shoe, a floating actuating lever, a pivoted lever, one of said levers being substantially between the other and the backing plate and means providing a floating connection between said levers, said levers extending substantially perpendicular to a radius through the pivot of said pivoted lever.

9. A brake comprising a backing plate, a floating friction shoe having a web, an actuating lever adapted to float with said shoe extending between the web of said shoe and said backing plate, a lever pivoted on the backing plate adjacent the floating center of rotation of said actuating lever and extending between the shoe web and backing plate, and means on one of said levers for floatingly engaging the other.

HUMPHREY F. PARKER.